W. O. LANE.
DEVICE TO PREVENT TROLLEY WHEELS FROM JUMPING.
APPLICATION FILED DEC. 20, 1907.
898,485.
Patented Sept. 15, 1908.
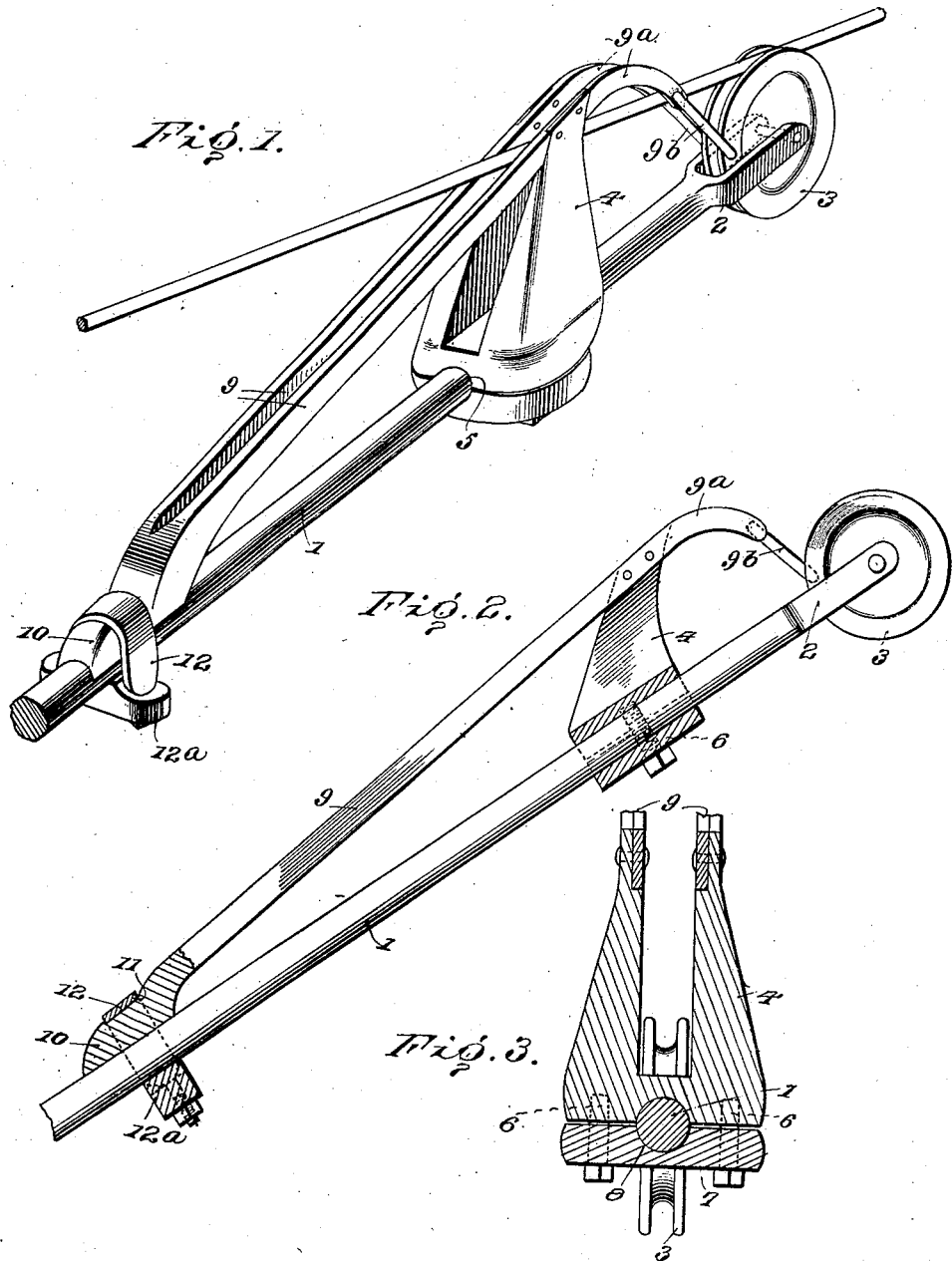
Witnesses
Inventor
W. O. Lane
By Attorneys

UNITED STATES PATENT OFFICE.

WILLIAM O. LANE, OF CLEVELAND, OHIO.

DEVICE TO PREVENT TROLLEY-WHEELS FROM JUMPING.

No. 898,485. Specification of Letters Patent. Patented Sept. 15, 1908.

Application filed December 20, 1907. Serial No. 407,372.

*To all whom it may concern:*

Be it known that I, WILLIAM O. LANE, citizen of the United States, residing at Cleveland, in the county of Cuyahoga and State of Ohio, have invented certain new and useful Improvements in Devices to Prevent Trolley-Wheels from Jumping, of which the following is a specification.

This invention has for its object a simple, durable and efficient construction of trolley guard which may be easily applied to a trolley pole and adjusted to the proper position to effectually protect the pole and wheel and serve to maintain the latter in proper alinement and contact with the wire, and the invention consists in certain constructions, arrangements and combinations of the parts that I shall hereinafter fully describe and claim.

For a full understanding of the invention, reference is to be had to the following description and accompanying drawings, in which:

Figure 1 is a perspective view of my improved trolley guard; Fig. 2 is a side elevation thereof with parts in section; and, Fig. 3 is a transverse sectional view, the section being taken through the main bracket of the device.

Corresponding and like parts are referred to in the following description and indicated in all the views of the drawings by the same reference characters.

Referring to the drawing, the numeral 1 designates a trolley pole which may be of any desired design or construction, 2 the harp thereof, and 3 the trolley wheel. My improved trolley guard comprises a forked bracket 4 which is designed to be secured at the requisite point on the upper end of the trolley pole 1 and which is formed in its cross-bar with a recess 5 to substantially fit the pole. The bracket 4 may be provided on opposite sides of the recess 5 with pins 6 threaded to receive nuts and designed to extend through a clamping plate 7 which is adapted to fit against the opposite side of the pole, as shown, so as to hold the bracket thereon, the plate 7 being also formed with a recess 8 to substantially fit the pole.

9 designates a pair of parallel guide arms that are designed to extend upwardly and rearwardly in advance of the trolley pole 1 and at a slight inclination thereto, said arms being formed integrally with or secured to the ends of the members of the forked bracket 4 intermediate of the ends of said arms and curving rearwardly from the bracket as indicated at $9^a$. The lower forward ends of the guide arms 9 are preferably integrally connected together by a stem 10 which is rounded to fit against the pole, as shown, and which is preferably formed in its outer side with a groove 11 to receive a clip 12 to hold the stem securely at the proper adjustment against the pole. The gland $12^a$ of the clip 12 is also preferably rounded to conform substantially to the shape of the trolley pole.

From the foregoing description in connection with the accompanying drawing, it will be seen that I have provided a very simple and effective construction of trolley guard which may be placed at the required position on the trolley pole, with relation to the trolley wheel, to take a switch at the same time the trolley wheel leaves the wire for the switch pan, and which in operation will also prevent a twisted trolley wire from riding up the side of a trolley wheel on a curve, with the consequent "jumping" of the wheel from the wire, and which in short will serve to maintain the trolley wheel in proper alinement to and in contact with the trolley wire.

The rear ends of the guide arms 9 are bonded with copper, in direct contact with the trolley wheel 3, as indicated at $9^b$.

Having thus described the invention, what is claimed as new is:

1. A device of the character described, comprising in combination with a trolley pole and trolley wheel, a forked bracket provided with a clamping plate by which it may be secured to the pole, a pair of parallel arms secured intermediate of their ends to the ends of the members of said bracket in advance of and extending at an inclination to the trolley pole, the upper ends of said arms being curved rearwardly, a stem secured to the lower ends of said arms, and means securing said stem to the trolley pole.

2. In a device of the character described, the combination with a trolley pole and its wheel, of a bracket secured to said trolley pole near the upper end thereof, a pair of spaced arms connected intermediate of their ends to said bracket and extending upwardly and rearwardly therefrom in advance of the pole, and means securing the lower ends of said arms to the pole.

3. The combination of a trolley pole and its wheel, and a forked bracket secured to the pole near the upper end of the same, a pair of spaced guide arms connected intermediate of their ends to said bracket and extending upwardly and rearwardly therefrom in advance of the pole, a grooved stem connecting together the lower ends of said arms, and a clip designed to secure said stem to the pole below the bracket.

In testimony whereof I affix my signature in presence of two witnesses.

WILLIAM O. LANE. [L. S.]

Witnesses:
 O. W. BROADWELL,
 J. B. SHERIDAN.